(12) United States Patent
Wells et al.

(10) Patent No.: US 7,695,853 B2
(45) Date of Patent: Apr. 13, 2010

(54) FRAMELESS MULTI-SIZE BATTERY COMPARTMENT WITH PASSIVE CAPTURE MECHANISM

(75) Inventors: Stephen Wells, Flowery Branch, GA (US); Henry Sully, Suwanee, GA (US)

(73) Assignee: ARRIS Group, Inc., Suwanee, GA (US)

( * ) Notice: Subject to any disclaimer, the term of this patent is extended or adjusted under 35 U.S.C. 154(b) by 766 days.

(21) Appl. No.: 11/529,187

(22) Filed: Sep. 28, 2006

(65) Prior Publication Data
US 2007/0072064 A1    Mar. 29, 2007

Related U.S. Application Data

(60) Provisional application No. 60/721,430, filed on Sep. 28, 2005.

(51) Int. Cl.
*H01M 2/10*    (2006.01)

(52) U.S. Cl. .............................. 429/96; 429/97; 429/100

(58) Field of Classification Search .......... 429/96–100, 429/163, 123, 1–347; 411/280, 442
See application file for complete search history.

(56) References Cited

U.S. PATENT DOCUMENTS

| | | | | |
|---|---|---|---|---|
| T896,007 I4 | * | 3/1972 | Stoneham et al. | 429/99 |
| 3,742,832 A | * | 7/1973 | Stoneham et al. | 396/539 |
| 5,552,240 A | * | 9/1996 | Derstine | 429/96 |
| 5,607,791 A | * | 3/1997 | Garcia et al. | 429/96 |
| 5,607,792 A | * | 3/1997 | Garcia et al. | 429/97 |
| 5,680,650 A | * | 10/1997 | Matsushita et al. | 396/157 |
| 2003/0082441 A1 | * | 5/2003 | Hovi et al. | 429/123 |

* cited by examiner

*Primary Examiner*—Dah-Wei D Yuan
*Assistant Examiner*—Katherine Turner
(74) *Attorney, Agent, or Firm*—Troy A. Van Aacken; Robert J. Starr

(57) ABSTRACT

A frameless battery cavity formed in a device enclosure retains a battery housing. Cantilever tabs on a battery end of a wall of the device housing have detents that forcibly engage the battery housing when the battery housing is fully inserted into the battery cavity. The detents are restrained from springing away from the battery housing when it is fully inserted by notches in a battery cover. The notches engage the detents after the battery has been fully inserted. The battery cover is secured in the opening to the battery cavity so that the detents are prevented from expanding away from the battery, and thus releasing the battery from the cavity, unless the cover is removed by a user. A guiding mechanism guides the battery housing into the cavity to facilitate electrical engagement of a connection between the battery housing and the device housing.

18 Claims, 6 Drawing Sheets

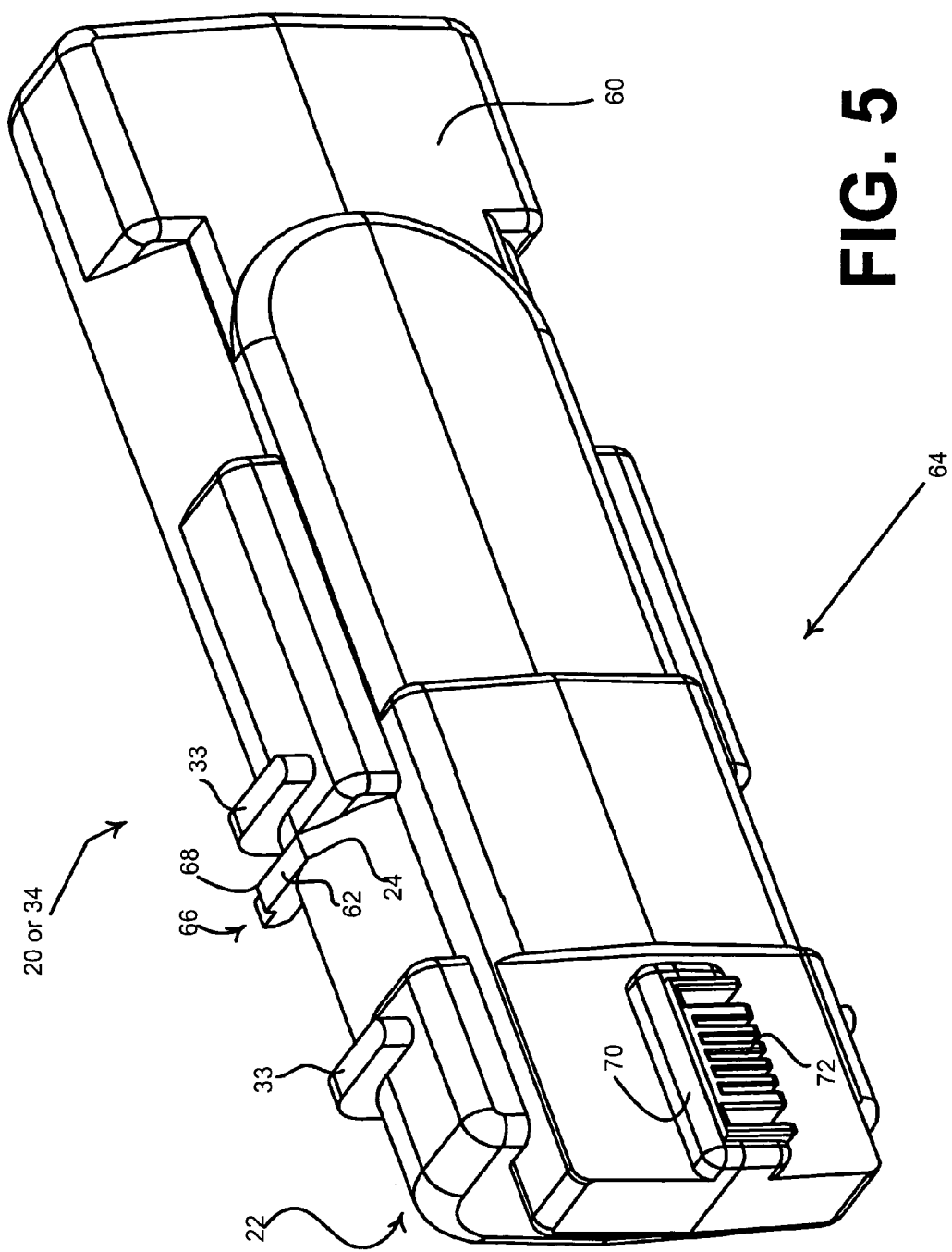

US 7,695,853 B2

FRAMELESS MULTI-SIZE BATTERY COMPARTMENT WITH PASSIVE CAPTURE MECHANISM

CROSS REFERENCE TO RELATED APPLICATION

This application claims priority under 35 U.S.C. 119(e) to U.S. provisional patent application No. 60/721,430 entitled "Two/four cell frameless battery compartment with passive capture mechanism," which was filed Sep. 28, 2005, and is incorporated herein by reference in its entirety.

FIELD OF THE INVENTION

The present invention relates generally to communication devices, and more particularly to a battery compartment/cavity and capture mechanism for multiple sizes of batteries.

BACKGROUND

Community antenna television ("CATV") networks have been used for more than four decades to deliver television programming to a large number of subscribers. Increasingly, CATV networks are used by providers to provide data services to subscribers. For example, cable modems used in a broadband cable modem termination system ("CMTS") compete with digital subscriber lines ("DSL") and DSL modems used therein, which are typically implemented and supported by telephone companies. DSL service is typically provided over the same wires as a residence's telephone service.

Cable modems, on the other hand, use the CATV cabling over which CATV programming is provided. Some cable television and cable data providers compete with telephone companies by offering telephony services over the CATV network using Internet protocol. This is known in the art as 'voice over IP' ("VoIP").

Conventional telephony networks provide electrical current from a central location to a user's telephony equipment for dial tone and off-hook signaling, for example. The power supplied from the telephone company's central location is provided from a utility company's power lines at the central office location under normal conditions, and is typically supplemented by a diesel generator in case off site power from the power company is interrupted. Thus, power for telephony service is always available; in an emergency, the local 911 operator can always be reached.

Although a CATV network often supplies some AC power for network devices, a subscriber's device or devices are typically powered by household AC current. Since most consumers do not have a diesel generator to back up off-site power supplied by a local utility company, batteries are typically used to provide a backup in case off-site power is lost. This allows a VoIP-over-CATV subscriber to place a telephone call during a power outage, including placing a call to a 911 operator in case an emergency situation requires contacting police, fire, paramedic, or medical personnel.

To increase reliability and reduce physical size, cable modem and other devices that support VoIP-over-CATV do not use the standard dry-cell batteries widely known to consumers in the familiar AAA, AA, C, D and 9-volt configurations. This is because rechargeable batteries are used so that immediately following a power outage, reasonable assurances are provided that the batteries will be operative. While power is being supplied from an off-site utility company, charge on the back-up batteries is being maintained or recharged. However, to maintain quality control and to facilitate particular size and shapes of devices, proprietary battery packs, preferably lithium ion, are provided by equipment manufactures to cable operators.

Depending on the price point of a given communication device, different size batteries may be specified. Typically, a device's housing is designed based on a particular battery configuration of a given size. Therefore, the device is typically constrained to always using the same battery size and configuration.

Communication device housings, as well as electronic device houses generally, typically include a compartment or well that receives and locates a battery or battery pack. Typically, the battery is inserted into the compartment/well and retaining 'door' or cover is placed over the compartment. The door/cover typically is snapped or screwed into place over the compartment and serves to retain the battery in the battery compartment. However, with respect to a snap-in door, if the device is dropped, and the door pops open, the battery may pop out of the device's battery compartment and become electrically disconnected. This scenario could present a problem if the user of the electrical device is in the middle of a critical operation.

Therefore, there is a need in the art for a device housing that can accept multiple battery sizes so that a user can specify the battery size based on his or her needs. Furthermore, there is a need for a battery compartment that does not require a frame, which is an extra structure within a electronics device housing, housings which are typically molded plastic or formed metal, to locate and retain a battery.

SUMMARY

A device enclosure includes opposing walls that form part of a housing, wherein each of the opposing walls has a battery end that partially forms the cavity. Each battery end defines an elongate edge of an opening of the battery cavity and at least one battery end forms at least one cantilever retaining tab. The cantilever tab, or tabs, have detents on a battery side of the battery end of the corresponding opposing wall in which the cantilever tabs are formed.

At least one of the opposing walls defines at least one rigid tab proximate the at least one cantilever tab and the at least one rigid tab forms at least one guide channel.

A battery housing including at least one guide rail for engaging with the at least one guide channel cooperates with the with the battery cavity to guide the battery into the cavity and to located a battery connection port formed into the battery housing with a corresponding battery connection formed into the device enclosure. A securable battery cover having notches for engaging with the detents when the cover is in a secured position restrains the cantilever tabs from flexing away from the battery cavity, thus aiding the detents in holding the battery/battery housing in the battery cavity.

BRIEF DESCRIPTION OF THE DRAWINGS

FIG. 5 illustrates a detent (detached from the cantilever tab for clarity) cooperating with a battery housing.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. This disclosure is not intended nor is to be construed to limit the present invention or otherwise to exclude other embodiments, adaptations, variations, modifications and equivalent arrangements, the present invention being limited only by the claims appended hereto and the equivalents thereof.

Figure 1:
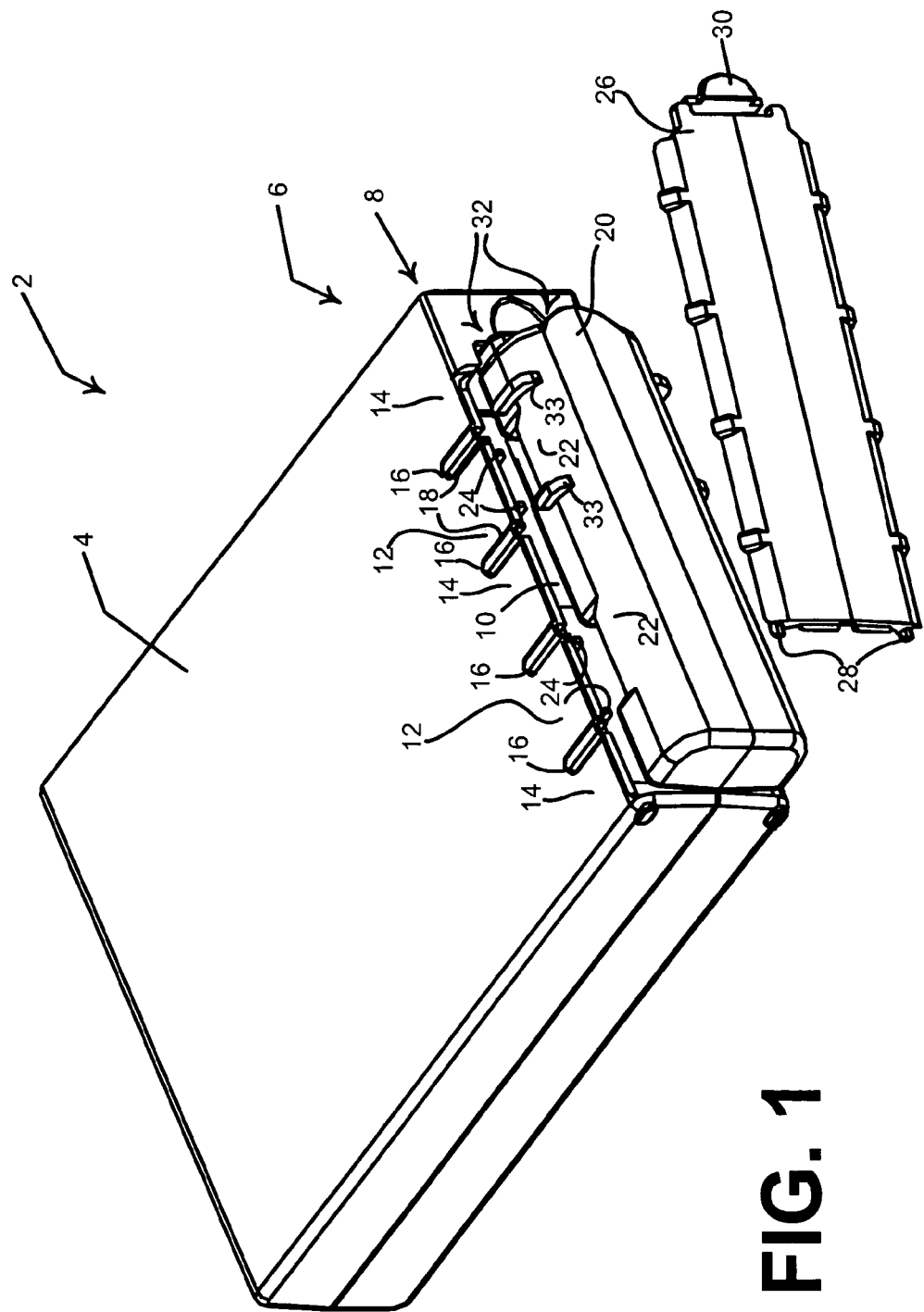
FIG. 1 illustrates a frameless battery cavity receiving a four-cell battery.

Turning now to FIG. 1, a device housing 2 is shown. Housing 2 includes two opposing walls, with opposing wall 4 shown in the figure. The wall that opposes wall 4 is a wall parallel to wall 4. It will be appreciated that the opposing walls need not be parallel planes, as the walls form the outer housing and for aesthetic purposes the walls may be curved outward with respect to one another, or one wall may be planar while the other is curved. For purposes of discussion of FIG. 1, features formed into wall 4 will be described. Similar features are preferably included in the wall opposing wall 4, but need not be. Wall 4 includes a battery end 6. Battery end 6 forms elongate edge 8, which defines battery compartment opening 10.

Cantilever tabs 12 are formed into the battery end of wall 4. Cantilever ends 12 are separated from rigid portions 14, which are stiffened by guide channels 16. The separation of cantilever ends 12 from rigid portions 14 forms separation gaps 18. Thus, cantilever ends 12 can flex perpendicular to wall 4 with respect to rigid portions 14.

When a battery housing 20, typically containing battery cells, a circuit and a connector coupled thereto, is inserted into opening 10, contact edges of battery housing 20 interfere with detents 24, which are formed into cantilever tabs 12. Thus, the insertion force of battery housing 20 entering opening 10 causes cantilever tabs 12 to move away from contact edge 22 as the contact edge engages with detents 24. Preferably, and will be shown in greater detail in other figures, the contact edge 22 is curved and detents 24 are similarly curved where they contact the contact edge when a battery housing is installed in housing 2. Thus, when battery housing 20 is fully inserted through opening 10, detents 24 retain the battery housing into the opening of device housing 2. It will be appreciated that detents 24 extent past elongate edge 8 in a direction away from opening 10. Thus, when battery cover 26 is secured over opening 10 with hinge tabs 28 and snap 30 retained by catch edges 32, notches formed on the back side (not shown in FIG. 1, but shown in other figures) engage the portions of detents 24 that extend past elongate edge 8 to prevent cantilever tabs 12 from flexing away from battery housing 20, thus assisting the cantilever tabs in retaining the battery housing inside the battery cavity to which opening 10 provides passage of the battery. Guide rails 33 are shown on battery housing 20. Guide rails may cooperate with guide channels 16 to facilitate guiding of the battery into the battery cavity of housing 2 so the electrical connections of the battery housing and the battery cavity properly couple.

Figure 2:
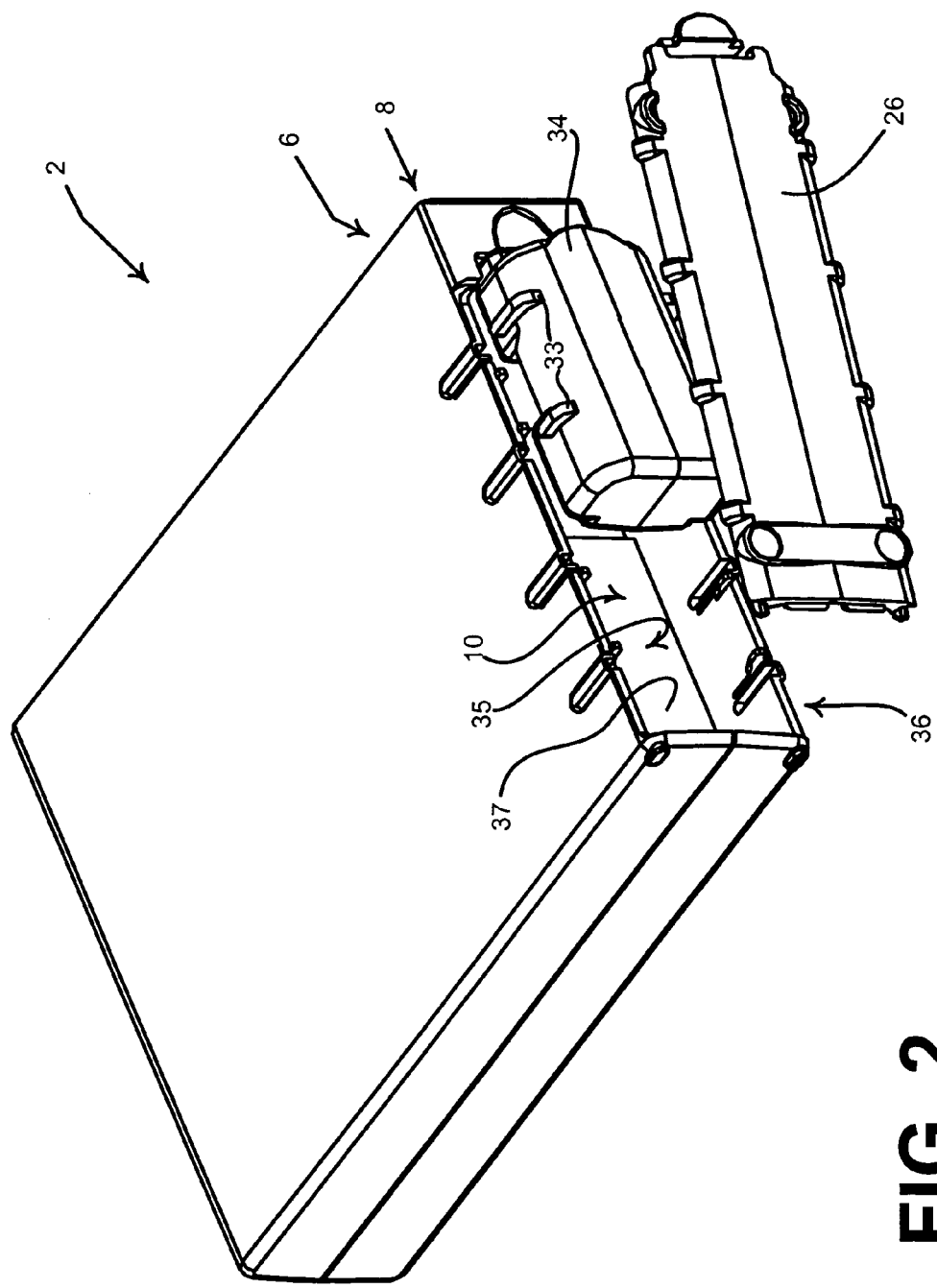
FIG. 2 illustrates a frameless battery cavity receiving a two-cell battery.

Turning now to FIG. 2, device housing 2 is shown receiving battery housing 34 into opening 10. In this embodiment, housing 2, walls 4 and features formed therein are similar to those described above in reference to the description of FIG. 1, except battery housing 34 is smaller that battery housing 20, which is shown in FIG. 1. Without battery housing 20 blocking the view, FIG. 2 illustrates battery cavity 35, which is partially defined by battery ends 6 and 36 and inner wall 37. Other features shown in FIG. 1 are shown for reference, including battery cover 26, elongate edge 8 and guide rails 33.

Figure 3:
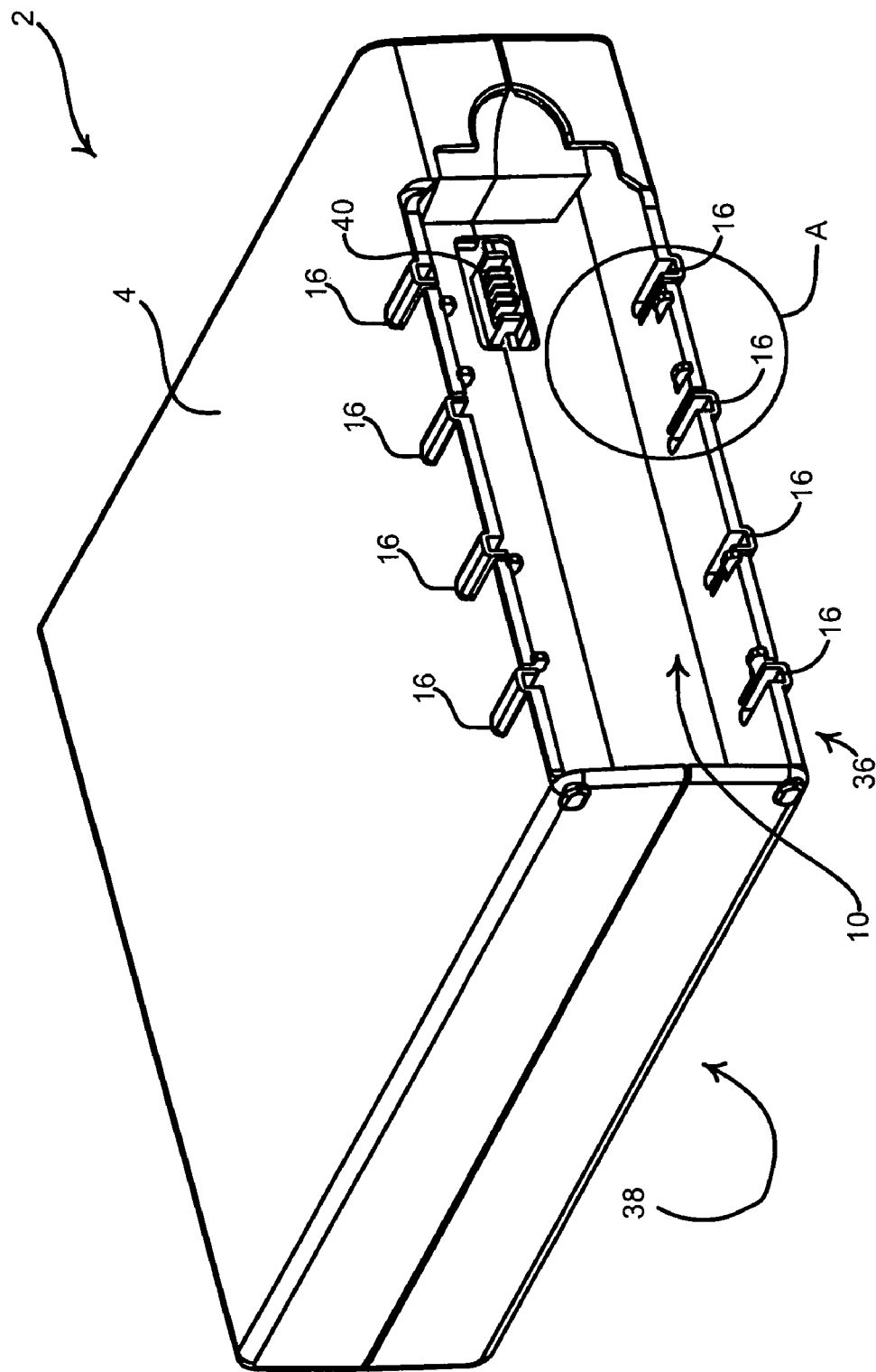
FIG. 3 illustrates a frameless battery cavity in a device housing.

Turning now to FIG. 3, the opening 10 defined by housing 2 is shown without a battery housing. Thus, the battery end 36 of opposing wall 38 is shown. In addition, a battery connection 40 that cooperatively couples with a corresponding connection on one of the battery housings discussed in reference to the description of other FIGS. is shown. The battery connections engage as the battery housing is inserted into opening 10 of device housing 2. The connections transfer energy from the battery cells inside the battery housing to circuitry inside the device housing 2.

In an aspect, battery connection 40 and the corresponding battery connection on the backside of battery cover 30 illustrated in FIGS. 1 and 2, may be formed so as to guide battery cover 20 or 34 into opening 10. In another aspect, guide rails on the battery housing and guide channels 16 cooperate when slidingly engaged to guide the battery into opening 10 so that battery connection 40 and the corresponding connection on the back of battery cover 20 illustrated in FIGS. 1 and 2 mechanically and electrically engage one another.

The embodiment shown in the figure illustrates guide channels 16 formed into battery ends 6 and 36 of opposing walls 4 and 38, respectively. However, guide channels 16 may be formed only in one or the other of opposing walls 4 and 38. Alternatively, the guide rails could be formed into the battery ends 6 and 36, with the guide channels formed into battery housing 20 or 34. It will be appreciated that, as discussed above, the guide channels or guide rails may not be formed into the battery ends or battery housing at all—the battery connection 40 and corresponding connection formed into the backside of the battery housing 20 or 34 may be formed to properly guide the battery housing into battery cavity 35. Section A shows a more detailed view of a guide channel and detent arrangement.

Figure 3A:
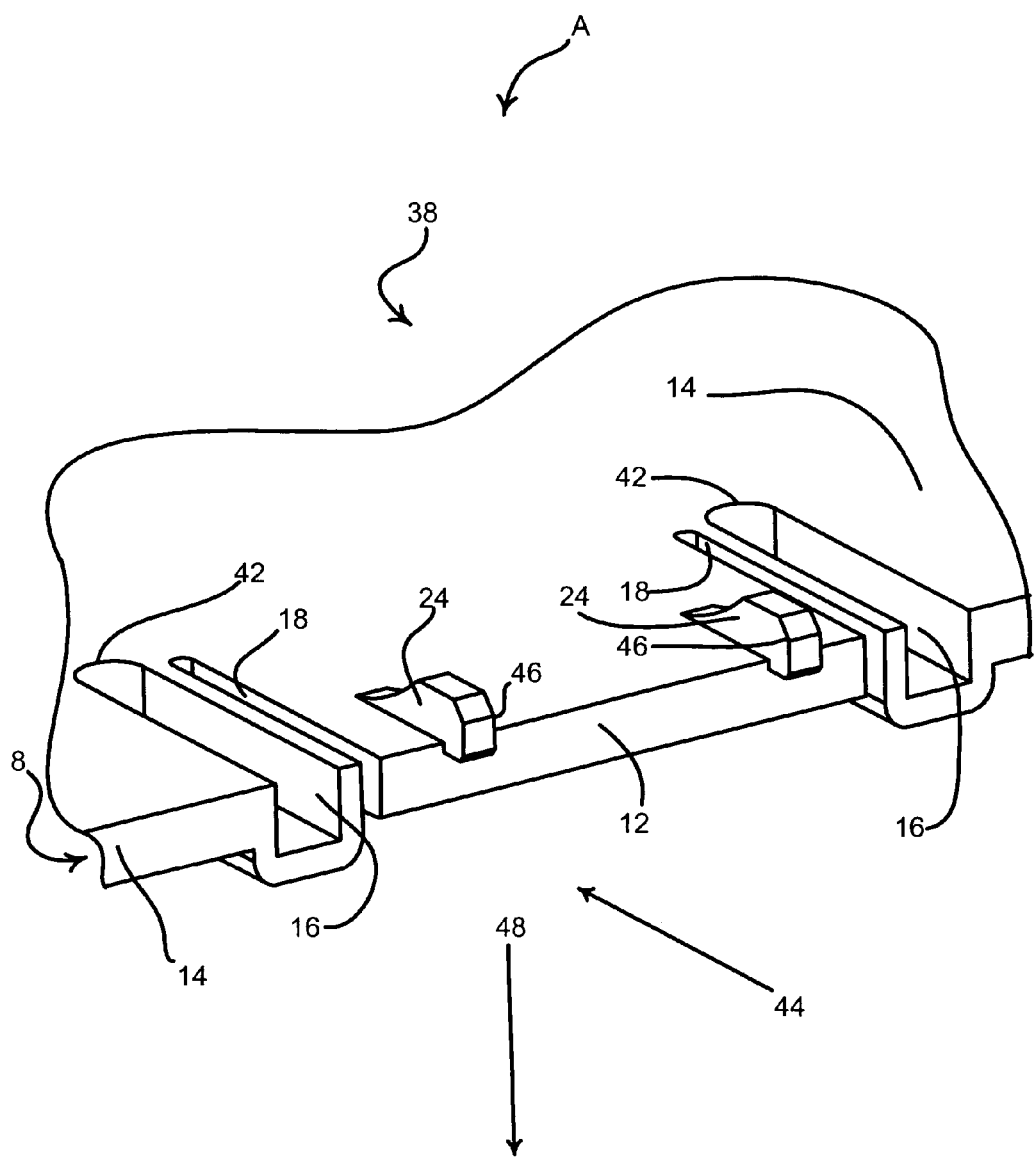
FIG. 3A illustrates a detail view of a cantilever tab and surrounding rigid portions of a battery end of an opposing wall of a device housing.

Turning now to FIG. 3A, a detailed view of a guide channel 16 and detent 24 arrangement are shown. It will be appreciated that the view is looking at a battery side of a battery end of opposing wall 39. Thus, channels 16 can slidingly engage with guide rails on a battery housing. It will be appreciated, however, that guide channels and guide rails are but one embodiment for guiding a battery housing into the battery cavity, and other means, such as, for example, cooperating guiding battery connections on the battery housing and the back wall of the battery cavity.

As discussed above, rigid portions 14 and cantilever tab 12 are formed into battery end 36, which is part of opposing wall 38. Channel 16 is formed into rigid portion 14 and detent 24 is formed into cantilever tab 12. Since distal points 42 (distal with respect to elongate edge 8) is where gaps 18 begin, cantilever tab 12 can flex with respect to rigid portions 14. Although the entire cantilever tab 12 may flex along gaps 18, the movement of the cantilever tab approximates movement that would occur if a spring-loaded hinge between distal points 42 attached the cantilever tab to rigid portions 14. Thus, when a battery housing is inserted into the battery cavity in direction 44, the battery housing contacts leading edges 46 of detents 24, thereby causing cantilever tab 12 to flex along the 'hinge' between distal points 24 in direction 48.

Figure 4:
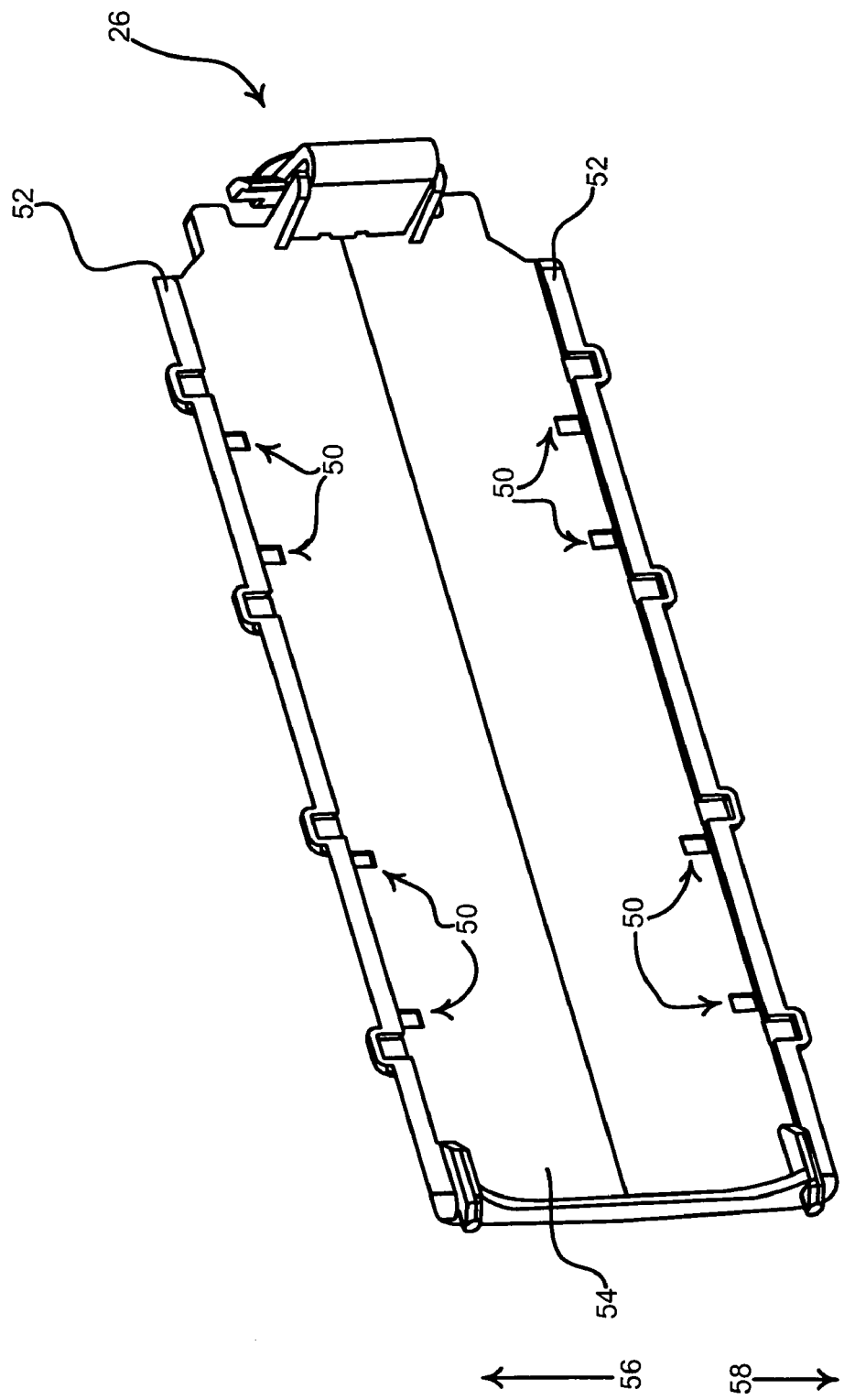
FIG. 4 illustrates the battery side of a battery cover.

Turning now to FIG. 4, the back side, or inner side facing the battery cavity of battery cover 26 is illustrated. Notches 50 engage with detents 24 shown in other figures, to prevent cantilever tabs of one opposing wall from flexing in away from the other opposing wall. Reinforcing ridges 52 extent toward the battery (out of the page in the figure) farther than surface 54, thus preventing detents 24 (shown in other figures) from flexing in directions 56 and 58 when battery cover 26 is snapped into place over opening 10 shown in FIGS. 1 and 2.

Turning now to FIG. 5, the forward side 60 of battery housing 20 or 34 is illustrated. As described above, in an embodiment that uses them, guide rails 33 may engage guide channels shown in other figures that are formed into the rigid portions of the battery end of the opposing walls. Detent 24 is shown detached from the cantilever retaining tab for clarity. The surface 62 is the surface that would be formed if detent 24 were detached from the cantilever retaining tab as shown in the figure.

It will be appreciated that contact surface 22 is curved and the surface of detent 24 that contacts contact surface 22 has a similar shaped curve. When battery housing 20 or 34 is seated into the battery cavity, the natural spring force of the flexible cantilever tab out of which surface 62 is formed exerts force in direction 58 to prevent movement of battery housing 20 or 34 in direction 64 out of the battery cavity. Extent 66 of detent 24 that extends past elongate edge 8, which is shown in other figures, the extent starting at break line 68, engages with one of notches 50 shown in FIG. 4. This engagement of extent 66 and notch 50 prevents movement of detent 24 in direction 56 when the battery is seated into the battery cavity and battery cover 26 is installed covering opening 10. It will be appreciated that alignment pad 70, or similar arrangement, may be used instead of guide rails to guide the battery housing 20 or 34 into the battery cavity so the proper alignment of battery connection 72 and complementary battery connection 40 shown in FIG. 3 is made. In addition, the electrical contact means, such as, for example, metallic tabs coupled to a circuit board, could be manufactured to be rigid enough to self-guide themselves into complementary metallic clips coupled to a circuit board located within the device housing.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A device housing defining a battery cavity, comprising:
    opposing walls forming a portion of the device housing, wherein each of the opposing walls has a battery end that partially forms the battery cavity, and wherein at least one battery end forms at least one cantilever retaining tab having detents on a battery side of the battery end; and
    wherein at least one of the opposing walls defines at least one rigid portion proximate to and coplanar with the at least one cantilever retaining tab, the at least one rigid portion and the at least one cantilever retaining tab being divided by a separation.

2. The device housing of claim 1 wherein the at least one rigid portion forms at least one guide channel.

3. The device housing of claim 1 and wherein each battery end defines an elongate edge of an opening of the battery cavity.

4. The device housing of claim 1 wherein the opposing walls are essentially parallel planes.

5. The device housing of claim 1 wherein the opposing walls are curved.

6. A system for retaining a battery in a device housing, comprising:
    opposing walls forming a part of the device housing, wherein each of the opposing walls has a battery end that partially forms a battery cavity, and wherein at least one battery end forms at least one cantilever retaining tab having detents on a battery side of the battery end; and
    wherein at least one of the opposing walls defines at least one rigid portion proximate to and coplanar with the at least one cantilever retaining tab, the at least one rigid portion and the at least one cantilever retaining tab being divided by a separation.

7. The system of claim 6 wherein the at least one rigid portion forms at least one guide channel.

8. The system of claim 7 further comprising a battery housing wherein sliding interference between the battery housing and the detents causes the at least one cantilever retaining tab to spread away from one another as the battery housing is inserted into the battery cavity.

9. The system of claim 8 wherein the battery housing is shaped so that the detents spring back towards one another when the battery housing is fully inserted into the battery cavity.

10. The system of claim 9 wherein the detents contact a contact surface of the battery housing when the battery housing is fully inserted into the battery cavity.

11. The system of claim 8 further comprising a securable battery cover having notches for engaging with extents of the detents when the cover is in a secured position whereby the detents are restrained from spreading away from the battery.

12. The system of claim 7 further comprising a battery housing including at least one guide rail for engaging with the at least one guide channel; and a securable battery cover having notches for engaging with the detents when the cover is fully inserted whereby the at least one cantilever retaining tab is restrained from spreading away from the battery.

13. A system for retaining a battery in a device housing, comprising:
    opposing walls forming a part of the device housing, wherein each of the opposing walls has a battery end that partially forms a battery cavity, and wherein at least one battery end forms at least one cantilever retaining tab having detents on a battery side of the battery end;
    a battery housing wherein sliding interference between the battery housing and the detents causes the at least one cantilever retaining tab to spread away from one another as the battery housing is inserted into the battery cavity; and
    a securable battery cover having notches for engaging with extents of the detents when the cover is in a secured position whereby the detents are restrained from spreading away from the battery cavity;
    wherein at least one battery end comprises at least one rigid portion proximate to and coplanar with the at least one cantilever retaining tab, the at least one rigid portion and the at least one cantilever retaining tab being divided by a separation.

14. The system of claim 13 wherein the at least one rigid portion includes one or more guide channels formed therein.

15. The system of claim 14 wherein the battery housing forms guide rails that slidingly cooperate with the one or more guide channels to guide the battery housing into the battery cavity as the battery housing is inserted there into.

16. The system of claim 14 wherein the battery housing further comprises an electrical connection having a guide means that slidingly cooperates with a complementary means formed in the device housing to guide the battery housing into the battery cavity.

17. The system of claim 13 wherein the opposing walls are essentially parallel planes.

18. The system of claim 13 wherein the opposing walls are curved.

* * * * *